United States Patent [19]

Grognu

[11] 4,253,779

[45] Mar. 3, 1981

[54] METHOD FOR ALIGNING TWO SUBMERGED PIPE SECTIONS

[75] Inventor: Paul D. Grognu, Marseille, France

[73] Assignee: Companie Maritime d'Expertises S.A., Marseille, France

[21] Appl. No.: 886,942

[22] Filed: Mar. 15, 1978

[30] Foreign Application Priority Data

Apr. 1, 1977 [FR] France ................................ 77 10498

[51] Int. Cl.³ .......................... F16L 1/04; B63C 11/00
[52] U.S. Cl. ..................................... 405/169; 405/170; 405/188
[58] Field of Search ................ 405/169, 170, 171, 189, 405/190, 154, 156, 188

[56] References Cited

U.S. PATENT DOCUMENTS

| 3,204,417 | 9/1965 | Robley | 405/170 |
| 3,508,410 | 4/1970 | Lynch | 405/188 X |
| 3,578,233 | 5/1971 | Meister | 405/170 X |
| 3,641,777 | 2/1972 | Banjavich et al. | 405/188 |
| 3,658,231 | 4/1972 | Gilman | 405/170 X |
| 3,785,160 | 1/1974 | Banjavich et al. | 405/189 X |
| 4,028,903 | 6/1977 | Dietrich | 405/170 |
| 4,109,480 | 8/1978 | Sumner | 405/170 |

*Primary Examiner*—Dennis L. Taylor
*Attorney, Agent, or Firm*—Lewis H. Eslinger

[57] ABSTRACT

The invention relates to a method for the alignment of two submerged pipe sections and to an apparatus for performing this method.

The invention comprises the use of two lifters for lifting the pipe sections to be joined together until their ends are substantially parallel. A liner is lowered with slightly negative buoyancy up to the pipe sections and above their ends which are to be joined together. It is fixed to said section by its clamping means and is made to bear freely on the sea bed via retractable feet permitting the lateral sliding of the liner. The final alignment phase of the pipe section is obtained by the clamping means of the liner and from inside the welding chamber in which are located the ends of said pipe sections.

6 Claims, 8 Drawing Figures

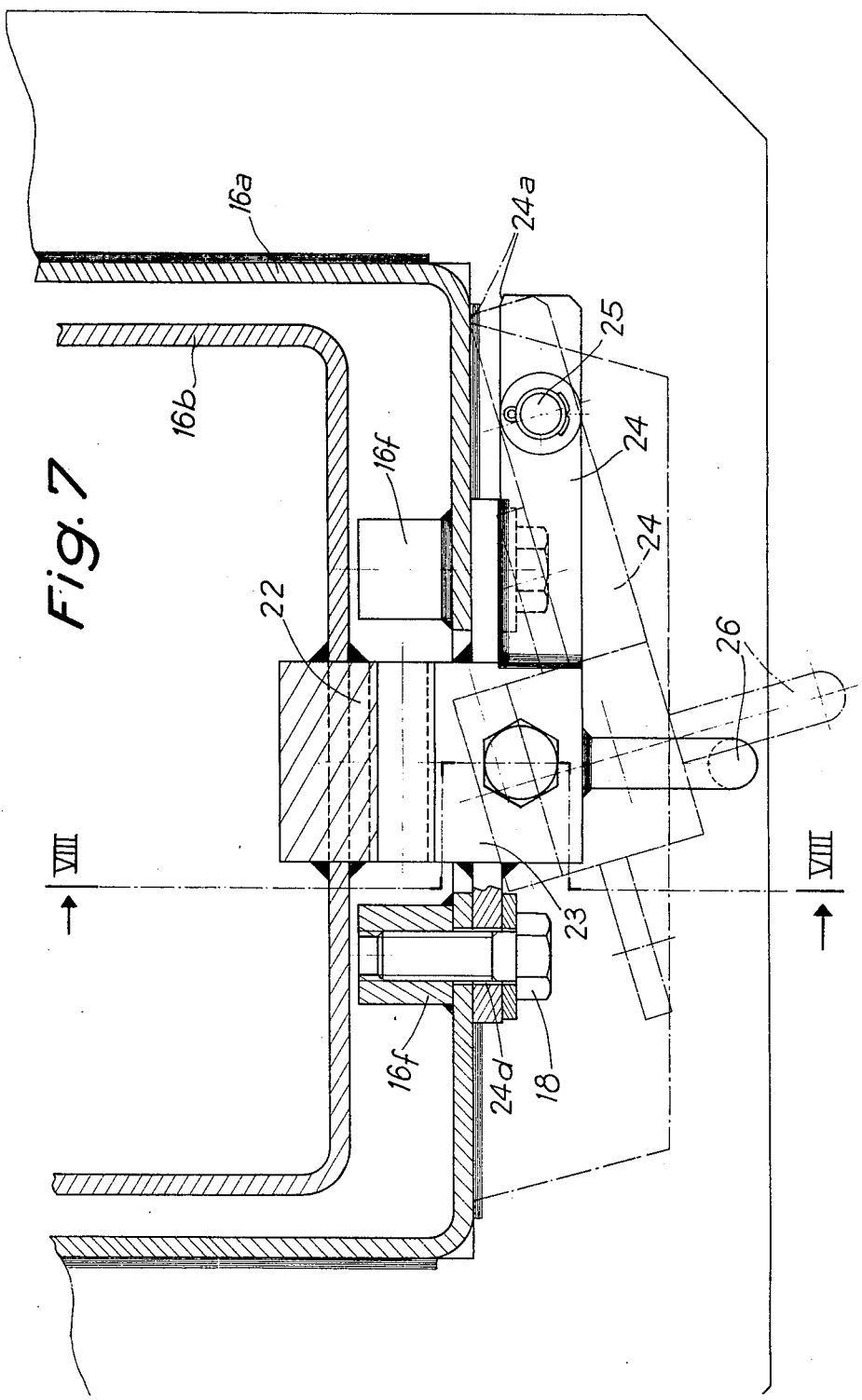

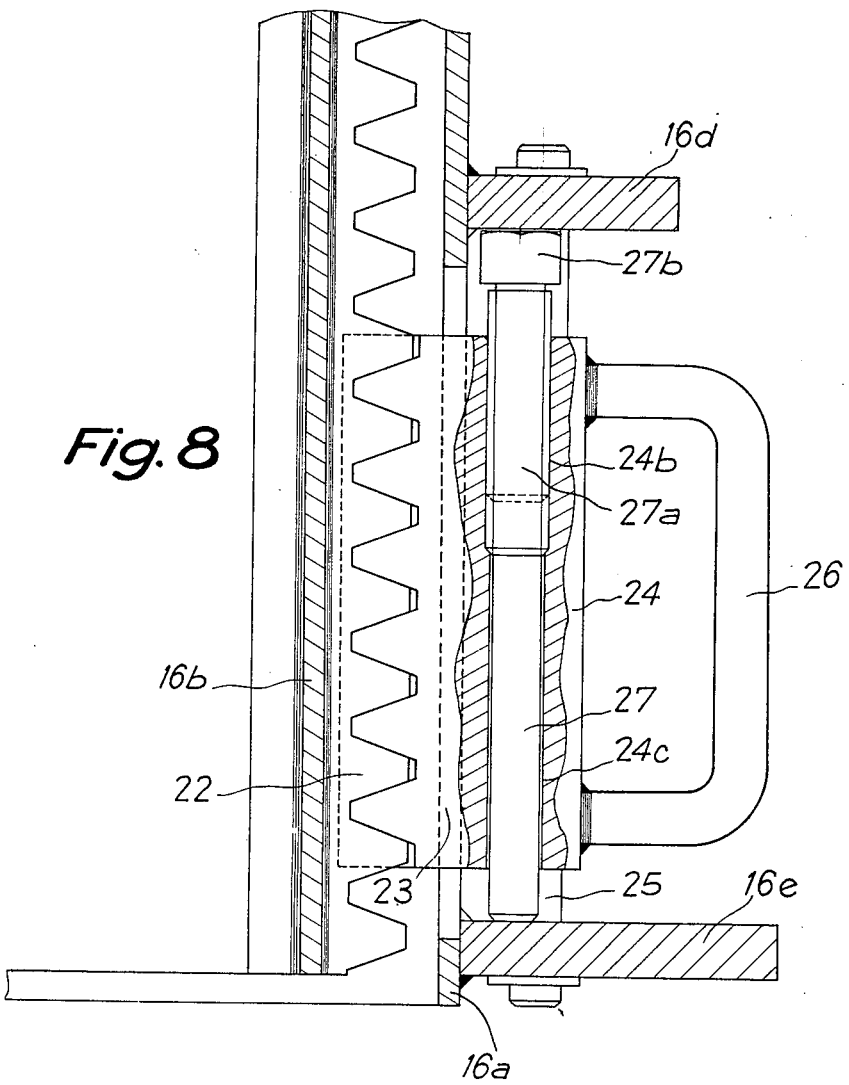

METHOD FOR ALIGNING TWO SUBMERGED PIPE SECTIONS

BACKGROUND OF THE INVENTION

The present invention relates to a method for aligning two submerged pipe sections and to an apparatus for performing this method.

The technical field of the invention is that of methods and apparatus used for working under water.

Various methods and apparatus are known with respect to the alignment of pipes laid on the sea bed with a view to their joining together, particularly by welding in a gas pocket either by means of light-weight structures called "lifters" or by means of larger, heavier structures called "liners".

Said liners are placed on the bed and above the pipe and have handling and alignment means for picking up, raising and lining the pipe sections. Due to the fact that the deformations by bending the pipe are caused over short distances, the loads involved and the resulting stresses in the pipe are very considerable.

The use of such light-weight structures or lifters makes it possible to handle and align the submerged pipe sections, although such means do not always make it possible to achieve the desired precision.

Said lifters have already been used in combination with the liners in the following manner:

Two lifters are placed above the pipe, each at a relatively great distance from the welding point, approximately 20 to 30 meters in the case of conventional pipe dimensions and are manipulated so as to raise the pipe sections to the level of the welding zone, whereby said deformed sections are substantially horizontal to the bed and are at a distance therefrom which permits welding. A heavy metallic structure or liner is then brought above the ends of the pipe sections and is anchored to the sea bed. It grasps the pipe sections by means of clamps and aligns them. The loads involved are not as high as when the alignment is carried out with the liner alone, but are still significant, leading to excessive stressing of certain areas of the pipe.

BRIEF SUMMARY OF THE INVENTION

The object of the present invention is to provide improvements to the known methods and apparatus with a view to obviating the above disadvantages.

The aim is to align pipes laid on the sea bed whilst respecting the tolerances permitting their joining together by welding in a chamber containing a gas pocket, whereby said alignment must be obtained by applying the minimum loads to the pipe sections during their alignment and thus reducing to a minimum the stresses in the pipe.

According to the invention, this is achieved by means of a method for the alignment of two submerged pipe sections utilising on the one hand a structure of liner comprising three parts of which one constitutes the location of a welding chamber and the two others constitute alignment means and on the other hand handling equipment called lifters, said method comprising the following operations:

(a) the lifters are placed at a relatively large distance from the ends of the pipe sections and are fixed to said sections;

(b) the pipe sections are raised to a sufficient height to permit their subsequent welding in such a way that their ends are substantially parallel to the bed;

(c) the lifters are manipulated in such a way as to bring about a first fundamental alignment of the pipe sections;

(d) the liner is submerged, being lowered with a slightly negative buoyancy until it reaches the pipe where it is positioned between the lifters and above the ends of the pipe sections;

(e) the liner is maintained in slightly negative buoyancy and is placed on the said pipe sections in such a way that the latter bear on adjusting means integral with the liner;

(f) the liner is fixed to said pipe sections by means of gripping members;

(g) the liner is made to bear freely on the sea bed;

(h) a second or visual alignment is effected of the pipe sections by means of the gripping members of the liner;

(i) the pipe sections are fixed to the right of the adjusting means;

(j) the ends of the pipe sections are surrounded by a welding chamber and (k) the permanent pre-welding alignment of the pipe sections is effected from within the welding chamber by manipulating the liner gripping members.

After the pipe sections have been made to bear on said adjusting means which are integral with the liner, securing means are placed beneath the pipe sections and to the right of the adjusting means. As a variant and so as to be able to bend the pipe after the so-called visual alignment has been carried out the pipe sections are again raised by means of said lifters.

The object of the invention is also achieved by the alignment apparatus or liner according to the invention for the performance of the above-mentioned method, said apparatus comprising a structure in three parts, the one in the centre constituting the location of a welding chamber which is extended on either side by two other parts having gripping and alignment means for the pipe sections located substantially in the longitudinal axis of the liner and comprise clamps articulated to said structure which move in planes perpendicular to said longitudinal axis and are operated by means of jacks. Each clamp has at least two jaws whose opening and closing are assured by a double-acting jack, said jaws being articulated on a stirrup which is connected to the structrue of the apparatus by a double-acting jack in order to raise or lower the clamp perpendicularly to the longitudinal axis of the liner. The stirrup which carries the jaws is connected to the structure by guidance arms articulated on the one hand to the structure and on the other to the stirrup.

The said alignment means are disposed in the longitudinal axis of the liner on either side of the welding chamber and comprise fixed supports located in planes perpendicular to said longitudinal axis and having a cutout oriented towards the lower part of the liner in order to permit the reception of a pipe section, whilst partly narrowly enveloping the same.

Each fixed support has two straps positioned on either side and located in planes parallel to that in which the said fixed support is located.

At each of its ends, the liner according to the invention has two feet located on either side of the longitudinal axis thereof, the length of said feet being adjustable, whilst means are provided for immobilising them at the desired length.

Thus, the method and apparatus according to the invention make it possible to solve the set problem. This procedure leads to a certain number of advantages. The pipes are aligned in several stages by means of lifters which disengage the pipe sections over considerable lengths (between 20 and 100 meters) and by means of the liner according to the invention. Thus, the pipe sections are firstly provisionally adjusted in such a way that their ends form an angle of approximately ±1° in the vertical plane and ±1° 30' in the horizontal plane. The loads supplied by this operation with a view to significantly bending the said pipe sections are small and the alignment of the pipe is largely carried out by the lifters only. The liner is only used for carrying out the final alignment which, as has been stated hereinbefore is obtained in two stages. The liner is submerged with slightly negative buoyancy of the order of 0.5 to 2 metric tons and is brought above the ends of the pipe sections in this condition. It is then fixed to the pipe by means of its gripping members and fixed supports and its feet are in the retracted or free position. The length of the latter is adjustable and they have wide base plates in order to:

(a) permit the sliding of the liner on the sea bed during the alignment phase;

(b) permit the welding of the pipe at the desired height;

(c) make up for the sinking of the liner into the mud;

(d) possibly straighten the liner if the sea bed is at an angle;

(e) limit the torsion couple due to the non-symmetrical bearing on the sea bed.

With its construction where the feet comprise double-acting jacks, an excess pressure valve limits the maximum force which can be admitted to each of the feet.

The fixed supports disposed on the longitudinal axis of the liner between the gripping members serve to maintain the centre of the pipe sections fixed relative to the liner structure, whilst also permitting an angular displacement of the pipe relative to the support. The shape of the fixed support and the clearance existing between it and the pipe permit angular displacements.

The liner gripping members comprise clamps which permit the picking up, grasping and displacement of the particular pipe section in a plane perpendicular to the liner axis. The clamps must grasp the pipe, whilst still permitting it to effect angular displacements. To this end, the upper articulation of the clamp is connected to the head of the rod of the height-adjusting jack by a ball joint. The head of this rod is guided in the vertical plane by an arm which is pivoted on the liner. The clamp gripping device is independent of the displacement system in the vertical plane. The clamps are operated by double-acting jacks.

Thus, the method and the fittings of the liner according to the invention make it possible to align the submerged pipes with the maximum precision, without it being necessary to apply considerable loads thereto and thus subject them to excessive stresses.

BRIEF DESCRIPTION OF THE DRAWINGS

The invention will be described hereinafter relative to non-limitative embodiments and with reference to the attached drawings, wherein show:

FIG. 7 a part plan view of a foot equipping the liner of FIGS. 3 to 6.

FIG. 8 a part sectional view along the line VIII—VIII of FIG. 7.

DETAILED DESCRIPTION OF THE PREFERRED EMBODIMENTS

Figure 1:
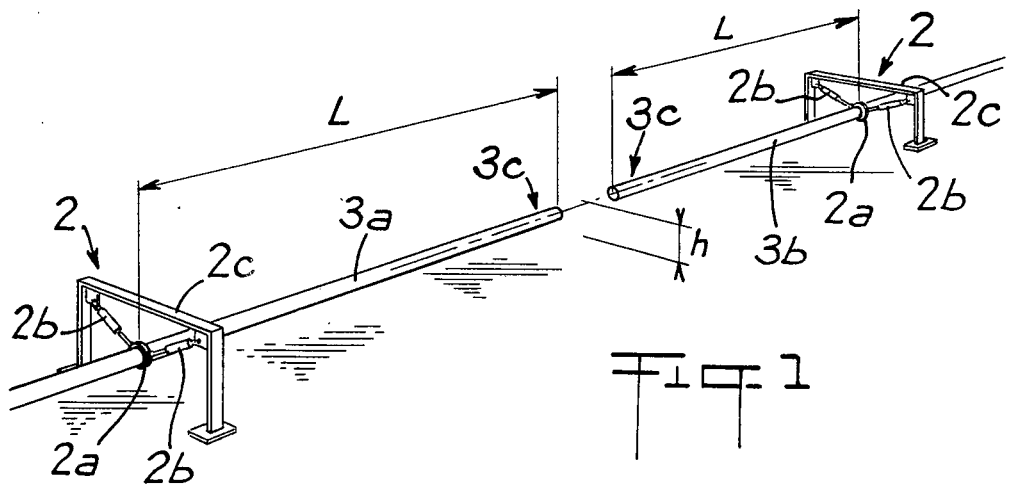
FIG. 1 a diagrammatic perspective view illustrating two pipe sections during the raising thereof with a view to effecting a first basic alignment by means of two light-weight structures called lifters.
Figure 2:
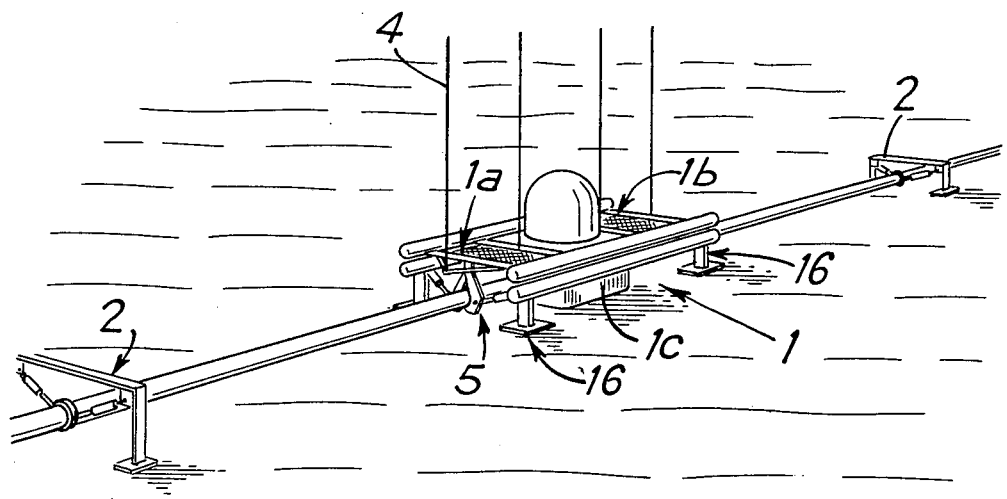
FIG. 2 a diagrammatic perspective view illustrating two pipe sections during their final alignment by means of a structure or liner according to the invention.

Reference is firstly made to FIGS. 1 and 2 which illustrate two phases of the alignment process according to the invention utilising on the one hand a structure or liner 1 and on the other at least two light-weight structures or lifters 2.

Liner 1 comprises three parts, whereof 1, 1c constitutes the location of a welding chamber and the two others 1a, 1b disposed on either side of part 1c and on the same longitudinal axis constitute alignment means for the pipe which will be described in greater detail hereinafter.

Lifters 2 are disposed at a distance L of the order of 20 to 30 meters from the ends of pipe sections 3a, 3b and are fixed to said sections by means of manipulating members 2a which in per se known manner are for example jaws articulated by means of jacks 2b to the gantry 2c of the lifters.

Lifters 2 are used to effect a first basic alignment.

The pipe sections 3a, 3b are then raised to a height h of the order of 1.30 m in such a way that their bending from their embedding point constituted by jaws 2a up to their free end determines a large curve and their ends 3c are thus positioned substantially parallel to the sea bed. In this position, it will subsequently be possible to join together said sections 3a, 3b, if necessary, by interposing a sleeve.

In this position which is substantially horizontal to the sea bed, the longitudinal axes of the pipe sections 3a, 3b form an angle of approximately 1° to the horizontal and in the vertical plane.

The lifters 2 are then used to effect a basic alignment in the horizontal plane and the pipe sections 3a, 3b are placed one behind the other until their longitudinal axes form an angle of approximately 1° 30' with the theoretical longitudinal axis of the aligned pipe.

Liner 1 is then submerged from a not shown surface support and is lowered by means of guide lines 4 fixed to pipe 3 in slightly negative buoyancy, for example of the order of 0.5 to 2 metric tons until said liner reaches the pipe. The liner is placed between lifters 2 and above the ends 3c of the pipe sections, the latter than being located in zone 1c of the liner reserved for the welding chamber and to which reference will be made hereinafter.

The liner 1 is maintained in slightly negative buoyancy and is placed on pipe sections 3a, 3b in such a way that they bear on adjusting means integral with liner 1 and located on the side of the location 1c of the welding chamber. These adjusting means, also called supports, will be described hereinafter.

Liner 1 is then fixed to pipe sections 3a, 3b by means of its gripping members 5 and bears freely on the sea bed. The term "bearing freely" is used to show the difference between that and "anchored" bearing on the sea bed, i.e. in the case where the liner rests with all its weight on the bed. Securing means are then placed beneath the pipe sections 3a, 3b to the right of said fixed supports in order to prevent any accident during manipulation, said means will be described hereinafter.

A second or visual alignment of pipe sections 3a, 3b is then effected by means of clamps 5 of liner 1 by acting on control members operated by divers working on the pipes. This alignment is carried out in an approximate manner and serves to place the pipe sections 3a, 3b in a position which is very close to their permanent alignment.

Optionally, and in the case where it is necessary to bend the pipe, the pipe sections 3a and/or 3b are again lifted by means of lifters 2.

The pipe sections 3a, 3b are then fixed to the right of the fixed supports, for example using a device with straps, which will be described hereinafter. However, this fixing still permits an angular displacement of the pipe sections relative to said fixed supports in order to permit the alignment thereof.

With the pipe sections ready for permanent alignment with joining by welding, a welding chamber is lowered and is placed in location 1c of the liner, a gas pocket being formed therein.

It should be noted that the welding chamber can be formed around the pipe sections 3a, 3b and specifically in the case where the chamber walls are contiguous and articulated to the liner structure.

When the gas pocket has been formed and the work team has entered chamber 1c, the final alignment of the pipe sections 3a, 3b is carried out by controlling the manipulating members of clamps 5. Pipe sections 3a, 3b are then joined together by welding in a gas pocket which is for example at the pressure of the water surrounding the liner.

Figure 3:
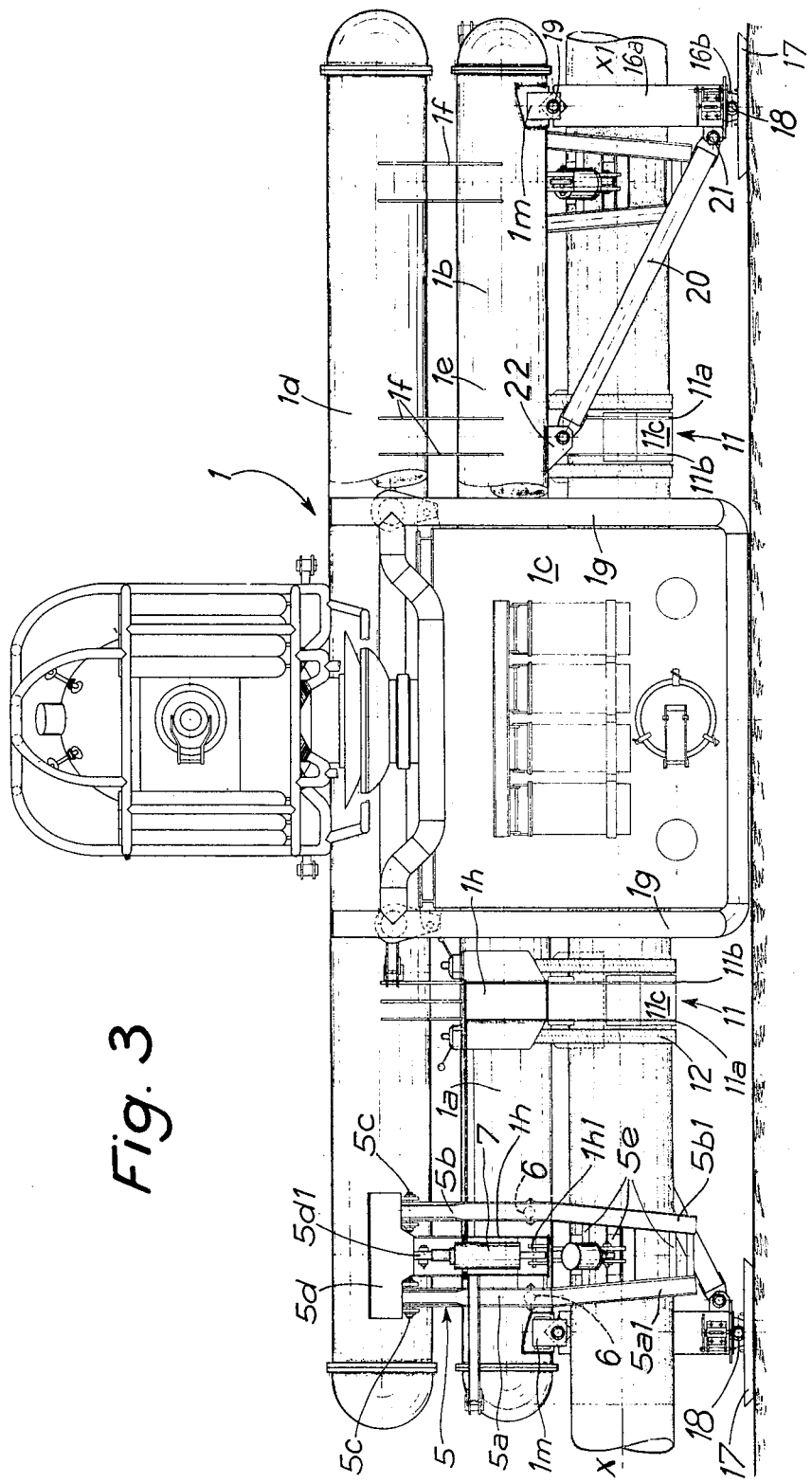
FIG. 3 a longitudinal half sectional elevational view of a pipe liner according to the invention.
Figure 4:
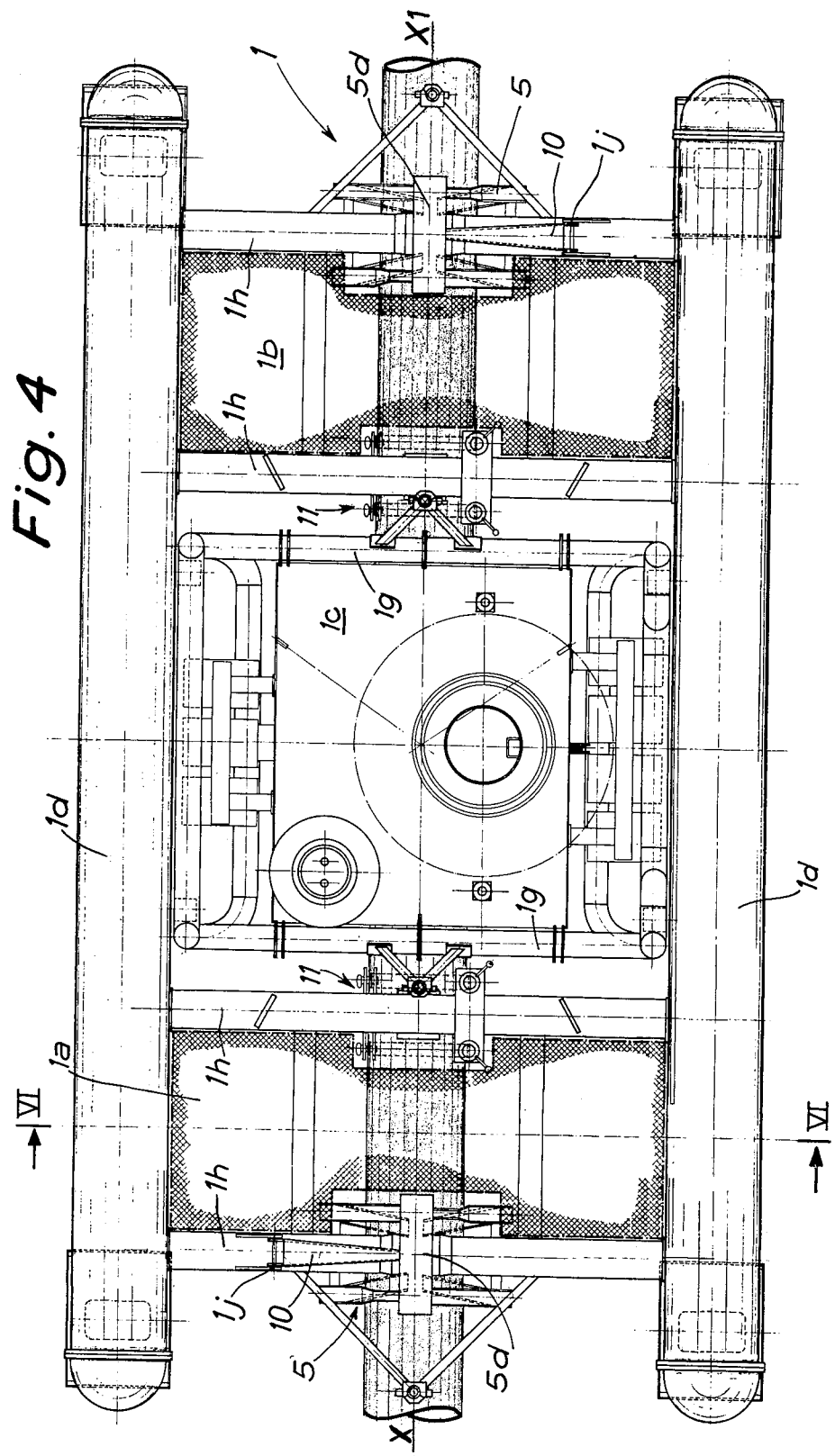
FIG. 4 a plan view of the liner of FIG. 3.
Figure 5:
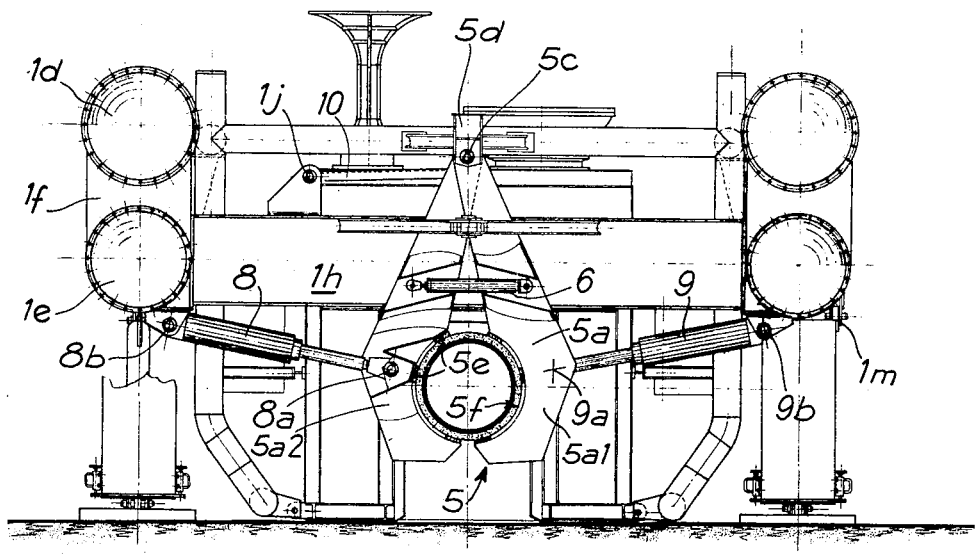
FIG. 5 a view from the left of the liner of FIG. 3.

Reference will now be made to FIGS. 3 to 5 which illustrate an embodiment of the pipe liner according to the invention operated in such a way that it can perform the above method.

Such a liner 1 is in three parts: a central part 1c which constitutes the location for a welding chamber and two other parts 1a, 1b disposed in the extension and on either side of part 1c in such a way that parts 1a, 1b, 1c are in the same longitudinal axis XX1.

The liner comprises a metal structure having in its upper part and on either side of axis XX1 tubular beams 1d, 1e which are parallel to one another in such a way that a system of beams 1d, 1e is located in the same vertical plane. These beams 1d, 1e are kept spaced apart by means of webs 1f.

A generally parallelepipedic tubular structure 1g defines the volume reserved for the welding chamber.

The systems of longitudinal beams 1d, 1e are connected by four transverse tubular girders 1h. These girders are grouped in pairs to the right of sections 1a, 1b, are located in the plane of beam 1e and have a rectangular cross-section. The girders 1h located at the ends of the liner carry gripping members or clamps 5.

Clamps 5 comprise in each case two jaws formed by two elements 5a, 5b articulated at 5c to the ends of a stirrup 5d for movement in parallel planes. Elements 5a1, 5a2, 5b1, 5b2 are produced by mechanical welding. As can be seen in the drawings, each jaw comprises two elements 5a1, 5b1—5a2, 5b2 connected in pairs by means of cross-members 5e. These cross-members of which there are for example three per jaw, are located on the periphery of circular cutouts 5f whose diameter is related to the external diameter of the pipe. These cutouts are located below the transverse girders 1h.

The opening or closing of each clamp 5 is assured by two double-acting jacks 6 articulated respectively to elements 5a1, 5a2–5b1, 5b2 and located in the plane of said elements. These jacks are positioned above circular cutouts 5f and are substantially horizontal.

These clamps extend over almost the entire height of the liner and viewed from the front (FIG. 5) and in the closed position, they assume a generally diamond-shaped configuration. Viewed from the side, (FIG. 3) their elements 5a1, 5b1 are slightly convergent from top to bottom as from half their length.

Clamps 5 are constructed so as to be displaceable in planes perpendicular to axis XX1 and are operated by three double-acting jacks 7, 8, 9. Jacks 7 (FIG. 3) are articulated in girders h located at the ends of the liner and to stirrups 5d. Jacks 8 and 9 are articulated to the clamp jaws and to the structure 1 below the transverse girders 1h and on the side of beams 1e.

Thus, each clamp 5 is carried by a jack 7 articulated at $1h_1$ in the centre and in the lower part of girder 1h and in the upper part at $5d_1$ below and in the centre of stirrup 5d.

In the upper part, the clamp is connected to structure 1 by an arm 10 articulated to the liner in a fork at 1j and to the stirrup 5d at $5d_1$. The function of arm 10 is to guide the clamp in the plane perpendicular to axis XX1.

The lateral displacement in one or other direction of each clamp 5 is ensured by jacks 8 and 9. Jack 8 is articulated at 8a to jaw 5a2, 5b2, between and in the centre of the said members and at 8b in a fork integral with liner 1 below the left-hand beam 1e of the liner (FIG. 5). Jack 9 is articulated at 9a to jaw 5a1, 5b1 between and in the centre of said elements and at 9b in a fork fixed to liner 1 below the right-hand beam 1e of the liner (FIG. 5).

Obviously, as clamp 5 engages on the pipe, depending on whether one or other of its jacks 7, 8, 9 is energised, it will be possible to bring about the displacement of the pipe in the desired direction with a view of the alignment thereof. The spaces left between the jaws and the lateral elements of structure 1 permit a significant displacement of clamps 5.

It should be noted that the gripping device of the clamp by means of jack 6 is independent of the displacement device comprising jacks 7, 8 and 9.

Figure 6:
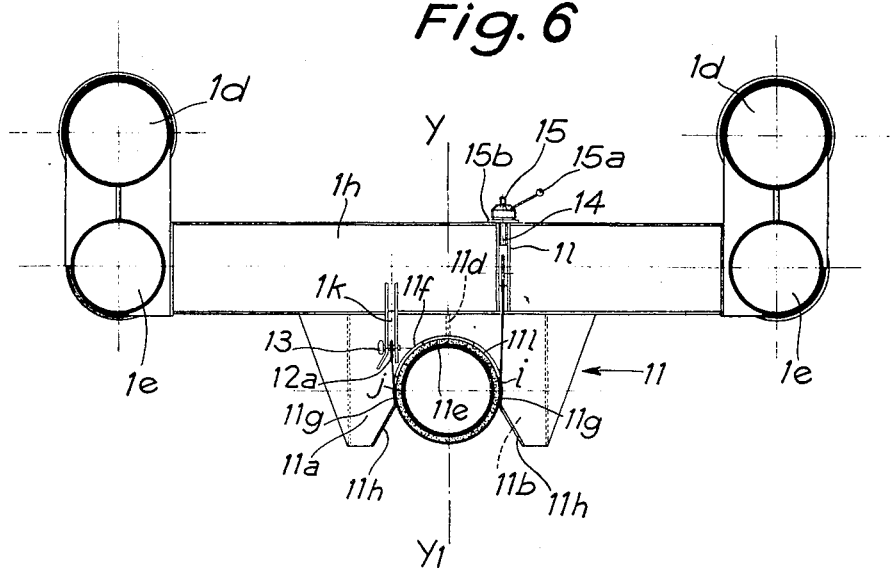
FIG. 6 a sectional view along the line VI—VI of FIG. 4.

The adjusting and alignment means of the pipe or fixed supports 11 are carried by transverse girders 1h located on the side of the location of welding chamber 1c and specifically in the centre of the latter (FIG. 6). They comprise a mechanically welded structure formed by two parallel webs 11a, 11b and extend perpendicularly to said girders 1h towards the bottom of the liner.

Webs 11a, 11b are joined to one another by means of two partitions 11c which are perpendicular thereto and disposed on either side of the longitudinal axis XX1 of the liner, by means of a partition 11d located in the plane of said axis and also by cross-members which come into contact with the pipe.

Webs 11a, 11b have a semicircular opening 11e which has a diameter related with that of the pipe in order to serve as a seat for the latter, whose centre is located in the axis of symmetry XX1 of the liner. The pipe bears for example on two cross-members 11f distributed around said openings 11e. The cross-members can have plates made from elastomer or any other material fixed to their face for receiving the pipe.

The circular opening 11e forms a semi-circumference and is extended firstly by two parallel edges of limited length 11g and then by two downwardly diverging edges 11h, whose function is to guide the pipe until it bears in the opening 11e during the installation of the liner. On either side, i.e. outside webs 11a, 11b each support 11 has straps 12, which are thus in planes parallel to one another and to the webs 11a, 11b.

Straps 12 are disposed in such a way that they downwardly deform the pipe. Their function is on the one hand to ensure the fixing of the pipe to the liner and to maintain it closely engaged in fixed supports 11 and on the other to serve as securing or safety devices during one of the phases of said process. During this phase, they are merely placed beneath the pipe without being tightened.

One end of straps 12 is fixed on either side of longitudinal axis XX1 to a support 1k, fixed to the lower part of transverse girders 1h, whilst the other end is fixed to a support 11 secured to the upper part of said girders 1h. To this end, one of their ends is perforated at 12a to receive a pin 13 which cooperates with the support 1k which in its lower portion forms a fork.

At their other end, straps 12 have a threaded rod 14, which passes through the upper part of support 11 and cooperates with a nut 15 having a manipulating arm 15a. This nut bears on support 11 via a washer 15b.

It is clear that when straps 12 have been placed beneath the pipe and attached to support 1k by means of pin 13, it is merely necessary to tighten nut 15 to ensure that the pipe is maintained in supports 11.

The clearance j between the pipe and the supports and the relative flexibility of straps 12 permit an angular displacement of the pipe sections in their fixed support, said displacement being of the order of ±6°. The straps 12 are for example made from a synthetic material, but they also comprise steel cables, metal bands or may even be in the form of links.

The feet 16 of liner 1 are disposed at its ends and on either side of axis XX1, whilst according to one embodiment they are articulated in forks 1m fixed beneath the tubular beams 1e. The length of feet 16 can be regulated and at their lower end they carry a base plate 17 mounted on ball joint 18.

Several constructional embodiments of such feet are possible. That shown in the drawing comprises a foot having on the one hand two telescopic members of rectangular cross-section 16a, 16b one of which slides in the other. The lower member 16b has at its free end base plate 17.

The upper member 16a is articulated by one end to the structure 1 in a fork 1m about a shaft 19 and by its other lower end to the end of a bracing strut 20 about a shaft 21. Strut 20 is also articulated at its other end about a shaft 22 cooperating with another fork fixed to the liner being located substantially level with the fixed support 11 (FIG. 3).

The movable member 7b of the foot according to one embodiment moves by means of its own weight and bears on the ground during the movement of the liner towards the pipe. Thus, of its own accord, it is positioned in an appropriate place for making the liner bear freely on the sea bed, whilst taking account of the relief of the latter. It can be joined to fixed member 16a by various means, for example pins, the latter being passed through holes made in fixed members 16a and movable members 16b whilst facing one another.

A more reliable apparatus is shown in FIGS. 3, 5, 7 and 8. It comprises two racks 22, 23 whose teeth cooperate to ensure the joining together of members 16a, 16b of the feet with maximum reliability.

In this embodiment, (FIGS. 7 and 8) rack 22 is permanently fixed, for example by welding, to the movable member 16b in the longitudinal axis of the latter and to the lower part thereof. Rack 23 is mounted on an articulated support 24 which pivots about a shaft 25 between two gusset plates 16d, 16e. Rack 23 (FIG. 8) extends over the length of support 24 and is slightly shorter than rack 22. Each of the shafts is immobilised in translation by any appropriate known means, for example by split pins and washers, extends in the lengthwise direction of the foot and is for example located to the right of said shaft (FIG. 7). Support 24 forms at its end opposite to that carrying rack 23 an abutment 24a in order to limit its outward pivoting during the disengagement of the racks. A handle 26 fixed to the right of rack 23 facilitates the operation.

Rack 23 and its support 24 are mounted along shaft 25 so as to be height-adjustable. Immobilisation in the vertical direction and in the desired position is effected by means of abutment shaft 27 which is in permanent contact with the inner face of gusset plate 16e or 16d and which passes through support 25, being parallel to rack 23.

This shaft, which extends over the length separating gusset plates 16d, 16e, is threaded at 27a at its upper end and has a hexagon head 27b in order to permit the manipulation thereof. The latter is located immediately below gusset plate 16d. Part 27a of the abutment shaft cooperates with the tapped portion 24b of the hole in which the shaft is passed through support 24. Tapped hole 24b extends over only part of the length of support 24 and is extended at 24c by a smooth hole (FIG. 8).

Shaft 27 is fitted with a slight clearance between the two gusset plates 16d, 16e and strikes one of the latter during the heightwise adjustment of support 24 and during its rotation brings about the displacement of the latter in one or other direction so as to make the teeth of rack 23 face the bottoms of the teeth of rack 22.

Once this adjustment has been carried out, supports 24 are fixed to member 16a of the foot by means for example of four screws 28 for each support passed through supports 24 in holes 24d and cooperating with tapped holes of bosses 16f fixed to fixed member 16a within the latter and extending in the space between members 16a, 16b.

In order to permit the heightwise regulation of support 24 in the direction of the longitudinal axis of the foot, holes 24d are oblong and extend parallel to said axis.

The manipulation of the feet described hereinbefore is carried out manually by divers.

It should be noted that their operation could be controlled remotely by means of double-acting jacks located within telescopic members 16a, 16b and having an excess pressure valve to limit the maximum force which can be admitted. Obviously, in such an embodiment, the rack system would be eliminated.

Another simplified embodiment of such regulatable feet need only have double-acting jacks articulated to the structure by one end and guided by means of arms fixed to structure 1 and to the end of their movable rod level with their base plate 17.

The present invention is not limited to the embodiments described and represented hereinbefore and various modifications can be made thereto without passing beyond the scope of the invention.

What is claimed is:

1. The method of aligning two submerged pipe sections on a sea bottom using an aligner structure having three sections one of which comprises a welding chamber and a separate pair of spaced apart pipe handling lifts, said method comprising the steps of:

positioning said lifts at points which are respectively located between twenty and thirty meters from the ends of the pipe sections to be joined;

attaching said lifts to said pipe sections to be joined;

raising said pipe sections with said lifts to position the ends of the pipes to be joined parallel to the sea bottom and in approximate longitudinal alignment with each other;

submerging said aligner structure;

positioning the aligner structures with a slight negative buoyancy between said lifts and above the ends of the pipe sections to be joined;

engaging the pipe sections with stationary chocking devices on the aligner structure extending at right angles to the pipe sections and resting the aligner structure on the pipe sections through said chocking devices with a slightly negative buoyancy;

gripping the pipe sections with gripping devices on the aligner structure;

resting said aligner structure on said sea bottom with slightly negtive bouyancy while permitting the aligner structure to pivot and slide on said bottom;

visually aligning said pipe sections by actuating said gripping devices;

surrounding the ends of said pipe sections with said welding chamber and thereafter making a final alignment of said pipe ends in said chamber by maneuvering said gripping devices while said aligner structure is free to move along the sea bottom.

2. A device for aligning and joining two submerged pipe sections comprising:

an aligner structure including three sections: a central welding chamber and a pair of supplemental frame structures on opposite sides of the welding chamber including means for gripping and means for aligning pipe sections; said gripping means comprising jaws movably mounted on said supplemental frame structures for movement in planes perpendicular to the longitudinal axis of the aligner and said pipe sections; said alignment means being positioned adjacent said welding chamber and including stationary supports positioned perpendicular to the longitudinal axis of the aligner; said stationary supports being semi-cylindrical members and partially surround an adjacent pipe section therebelow; and means for supporting the pipe sections in said stationary supports; said support means comprising at least one strap secured at one end of the frame element to extend below and around a supported pipe section beneath its associated stationary support to an opposite end; and means cooperating between said opposite end of the strap and the frame element for tightening the strap against the pipe section.

3. A device as defined in claim 2 including two of said straps associated with each of said stationary supports and extending parallel to each other.

4. A device as defined in claim 2 including at least two support feet secured to said frame elements at opposite ends of the aligner structure; said support feet including a pair of telescopic support elements and cooperating means for locking said telescopic elements in any of a plurality of relative positions; said cooperating means including cooperating toothed racks on said telescopic elements.

5. A device as defined in claim 4 wherein one of the toothed racks on one of the telescopic elements of each foot is pivotally mounted thereon to permit selective disengagement of said cooperating toothed racks to allow length adjustments of said feet.

6. A device as defined in claim 5 wherein each of said feet includes a base plate pivotally mounted thereon for engaging the sea bottom.

* * * * *